United States Patent
Immink et al.

(10) Patent No.: US 6,646,970 B1
(45) Date of Patent: Nov. 11, 2003

(54) THERMOMAGNETIC WRITING OF PULSE SEQUENCES OF CONTROLLED MAGNITUDE AND VARIABLY CONTROLLED DURATION

(75) Inventors: Albert H. J. Immink, Eindhoven (NL); Eise Carel Dijkmans, Eindhoven (NL); James J. A. McCormack, Eindhoven (NL); Andre G. J. Slenter, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 425 days.

(21) Appl. No.: 09/708,151

(22) Filed: Nov. 8, 2000

(30) Foreign Application Priority Data

Nov. 24, 1999 (EP) .............................. 99203938

(51) Int. Cl.$^7$ ................................. G11B 7/00
(52) U.S. Cl. ................. 369/59.11; 369/59.23; 369/59.24
(58) Field of Search ................. 369/120, 122, 369/47.1, 53.1, 53.11, 47.27; 360/51

(56) References Cited

U.S. PATENT DOCUMENTS

| 5,126,985 A | 6/1992 | Spruit et al. | 369/13 |
| 5,600,501 A | 2/1997 | Yamakoshi et al. | 360/51 |
| 6,101,055 A * | 8/2000 | Chainer et al. | 360/51 |

OTHER PUBLICATIONS

"Pulse width Modulation Modulator for Optical Recording", IBM Technical Disclosure Bulletin, US, IBM Corp., New York, vol. 39, No. 7, Jul. 1996, pp. 197–199, XP000627973.

* cited by examiner

Primary Examiner—Nabil Hindi
(74) Attorney, Agent, or Firm—Michael E. Belk

(57) ABSTRACT

A device according to the invention for writing information to an information carrier (1) includes conversion means (7) for converting symbols in an information signal ($S_{INFO}$) into pulse sequences in a control signal ($S_{TR}$). The device further includes a transducer (10) for generating a physically detectable pattern on the information carrier (1) in response to the control signal ($S_{TR}$). The conversion means (7) include assignment means (702) for assigning properties of the pulse sequences to symbols in the information signal ($S_{INFO}$). These properties include the duration and the magnitude of pulses in the pulse sequence. The conversion means (7) further include at least one counter (711) for supplying a count signal ($TC_1$) after a time interval, which counter is coupled to the assignment means (702). The conversion means (7) further include a controllable delay line (761) coupled to the at least one counter (711), for delaying the count signal ($TC_1$), and to the assignment means (702).

14 Claims, 7 Drawing Sheets

| Reeks informatie-eenheden voor het symbool I6 | | | | | |
|---|---|---|---|---|---|
| Adres | LVL1 | LVL2 | TIM1 | TIM2 | MOD |
| ......... | ......... | ......... | ......... | ......... | ......... |
| AI6 | 2 | 1 | 1 | 2 | 0 |
| AI6+1 | 2 | 6 | 3 | 5 | 0 |
| AI6+2 | 2 | 5 | 6 | 7 | 0 |
| AI6+3 | 2 | 2 | 2 | 8 | 0 |
| AI6+4 | 2 | 5 | 1 | 3 | 0 |
| AI6+5 | 2 | 2 | 3 | 1 | 0 |
| AI6+6 | 2 | 5 | 1 | 5 | 0 |
| AI6+7 | 2 | 2 | 3 | 9 | 0 |
| AI6+8 | 2 | 5 | 1 | 4 | 0 |
| AI6+9 | 2 | 2 | 3 | 2 | 0 |
| AI6+10 | 2 | 5 | 1 | 1 | 0 |
| AI6+11 | 2 | 2 | 2 | 1 | 0 |
| AI6+12 | 2 | 3 | 1 | 5 | 0 |
| AI6+13 | 2 | 4 | 2 | 4 | 0 |
| ......... | ......... | ......... | ......... | ......... | ......... |

FIG. 4

THERMOMAGNETIC WRITING OF PULSE SEQUENCES OF CONTROLLED MAGNITUDE AND VARIABLY CONTROLLED DURATION

The invention relates to a device for writing information onto an information carrier.

From U.S. Pat. No. 5,126,985 a device is known for writing information onto an information carrier of the thermomagnetic type. The known device has a transducer for generating physically detectable patterns in the information carrier. The transducer includes an optical write head and a magnetic write head. The device includes a synchronizing circuit for deriving control signals for the optical and the magnetic write head from the information signal. The synchronizing circuit comprises a phase-locked loop which derives a clock signal from the information signal and a delay element which supplies a delayed clock signal as write signal. As higher information densities and higher writing speeds are required it is necessary to control the instants of occurrence and the lengths of variations in the write signal more precisely. The precision of these parameters can be improved to a certain extent by increasing the clock frequency with which the circuits are synchronized. However, the maximum permissible clock frequency is limited.

It is an object of the invention to further improve the precision of said parameters without the clock frequency having to be raised. To this end, the invention provides a device for writing information onto an information carrier, which device includes conversion means for converting symbols in an information signal into pulse sequences in a control signal and a transducer for generating a physically detectable pattern on the information carrier in response to the control signal, which conversion means include assignment means for assigning properties of the pulse sequences to symbols in the information signal, which properties include the duration and the magnitude of pulses in the pulse sequences, which conversion means further include at least one counter for supplying a count signal after expiry of a time interval, which counter is coupled to the assignment means, wherein the conversion means further include a controllable delay line coupled to the at least one counter, for delaying the count signal, and to the assignment means.

In the device in accordance with the invention the conversion means convert the symbols of the information to be written, for example EFM encoded information, into sequences of pulses having a duration and an amplitude. By means of the counter a comparatively coarse control of the duration of the pulses is obtained, which is limited by the maximum clock frequency with which the counter can be synchronized. However, the controllable delay line makes it possible to delay the counting signal with a time resolution which is far more accurate than that of the clock signal and thereby further increase the precision of said parameters of the pulses to be generated.

These and further aspects of the device in accordance with the invention will be elucidated with reference to the drawings. In the drawings:

FIG. 4 shows an example of a content of memory means belonging to the part shown in FIG. 3.

Figure 1:
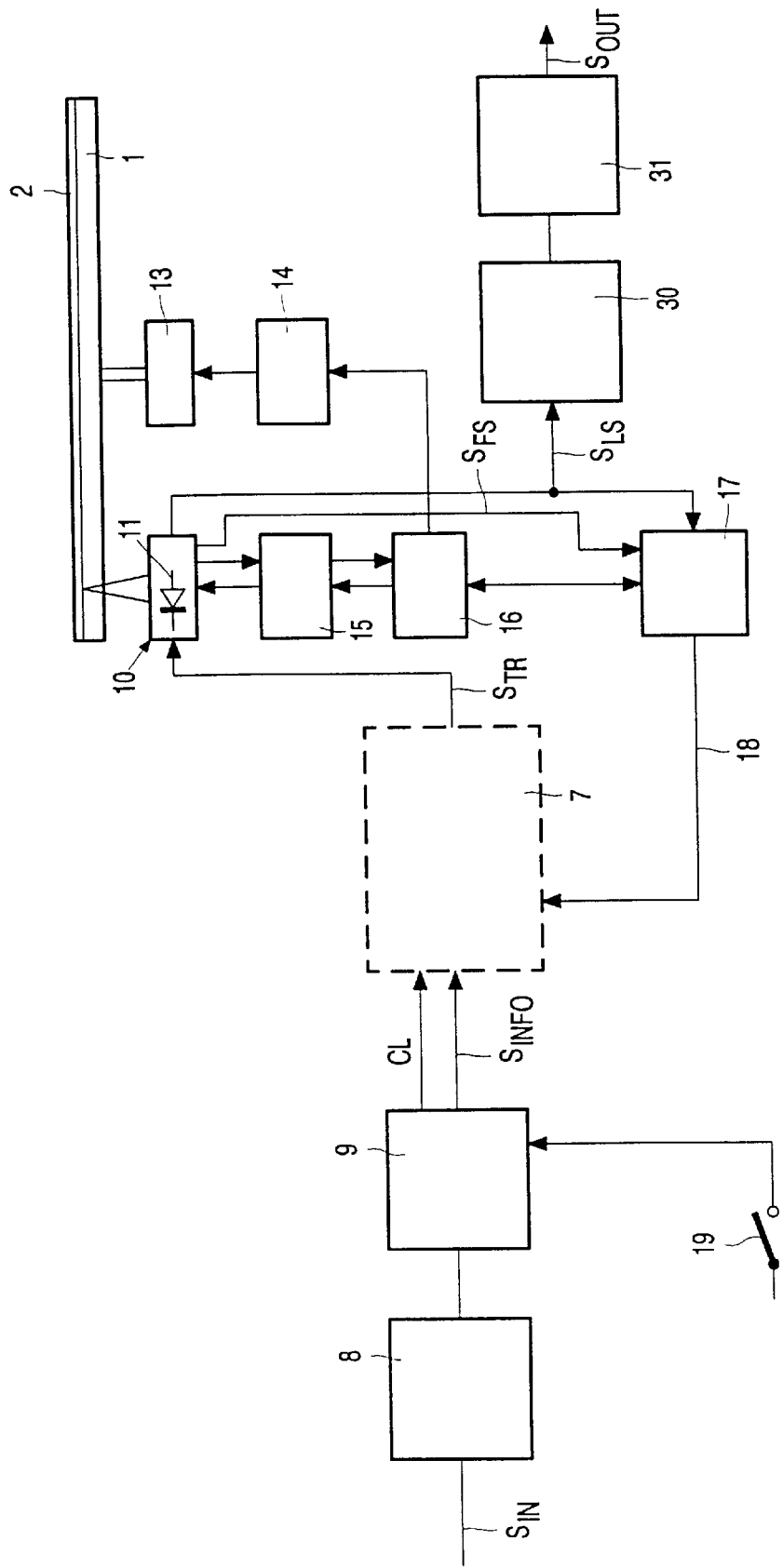
FIG. 1 shows diagrammatically a device in accordance with the invention.

FIG. 1 shows a device for writing information onto an information carrier 1. In the present case the device has a first mode of operation for writing information onto an information carrier and a second mode of operation for reading information from an information carrier. The information carrier 1 is, for example, of a write-once type, for example an information carrier of the ablative type. Alternatively, the information carrier may be of a rewritable type, for example an information carrier having an information layer of a material having an amorphous structure which can be transformed locally into a crystalline structure by successively heating and cooling the information layer. Such a material is for example an alloy of Te, Se and Sb. An overview of such materials is given in "Principles of Optical Disc Systems" by G. Bouwhuis, J. Braat, A. Huyser, J. Pasman, G. van Rosmalen and K. Schouhamer Immink, Adam Hilgei Ltd., Bristol 1985, pp. 219–255. Alternatively, the information carrier may be, for example, of the magneto-optical type. These information carriers have an information layer of a magnetizable material. The magnetization is influenced by locally heating the information layer to a temperature above the Curie temperature, for example by means of a laser beam and at the same time applying a magnetic field.

With the aid of the error correction encoding means 8 an error correction coding is applied to an input signal $S_{IN}$. The input signal $S_{IN}$ represents, for example, a stream of video data, audio data or computer data. Subsequently, an information signal $S_{INFO}$ is generated from the encoded signal by channel encoding with the aid of channel encoding means 9. The channel encoding means 9 are, for example, EFM or EFM+ channel encoding means. The information signal $S_{INFO}$ contains symbols in the form of intervals in which the signal has a constant logic value.

The device includes conversion means formed by a control unit 7 for the conversion of symbols in the information signal $S_{INFO}$ into a control signal $S_{TR}$. In the present case the control signal $S_{TR}$ is a supply current for energizing a radiation source 11, such as a solid-state laser.

The radiation source 11 forms part of a transducer 10 which in the first mode of operation generates physically detectable patterns in the information layer 2 of the information carrier 1 in response to the control signal $S_{TR}$.

In the present embodiment of the device the transducer 10 is also capable of generating a read signal $S_{LS}$ in response to physically detectable patterns in the information carrier in the second mode of operation. In the second mode of operation the transducer 10 also receives a control signal $S_{TR}$ from the control unit 7, which supplies electric power to the radiation source 11. In the second mode of operation the supply current $S_{TR}$ can be constant. However, it is favorable if in this mode of operation the supply current is given a high frequency modulation. Such a modulation suppresses relative intensity noise.

In the present embodiment the device is adapted to read and write information from/onto a disc-shaped information carrier 1. For this purpose, the device has a motor 13 for rotating the information carrier 1 and a control unit 14 for controlling the motor 13. The radial position of the transducer 10 is determined by a servo system 15. The servo system 15 and the control unit 14 are controlled by a microprocessor 16. The motor 14, the servo system 15 and the microprocessor 16 are of conventional types. The device further includes a regulating unit 17 controlled by the microprocessor 16. The regulating unit 17 receives signals $S_{FS}$, $S_{LS}$ from one or more sensors and in response to these signals it adapts parameters of the control unit 7 via a serial bus 18. Thus, it can be achieved that the power radiated by the radiation source 11 is not affected by aging and/or heating of the radiation source 11. It also enables power applied to the radiation source 11 to be adapted to the condition of the information carrier 1, as a result of which it is yet possible to achieve a reliable recording of the write signal, for example, even in the case of fingermarks on the information carrier 1.

In the present embodiment the device has a switch 19. By means of this switch 19 a user can set the device to the first or the second mode of operation. In the second mode of operation the value of the information signal $S_{INFO}$ is maintained until the device again assumes the first mode of operation again.

Figure 2:
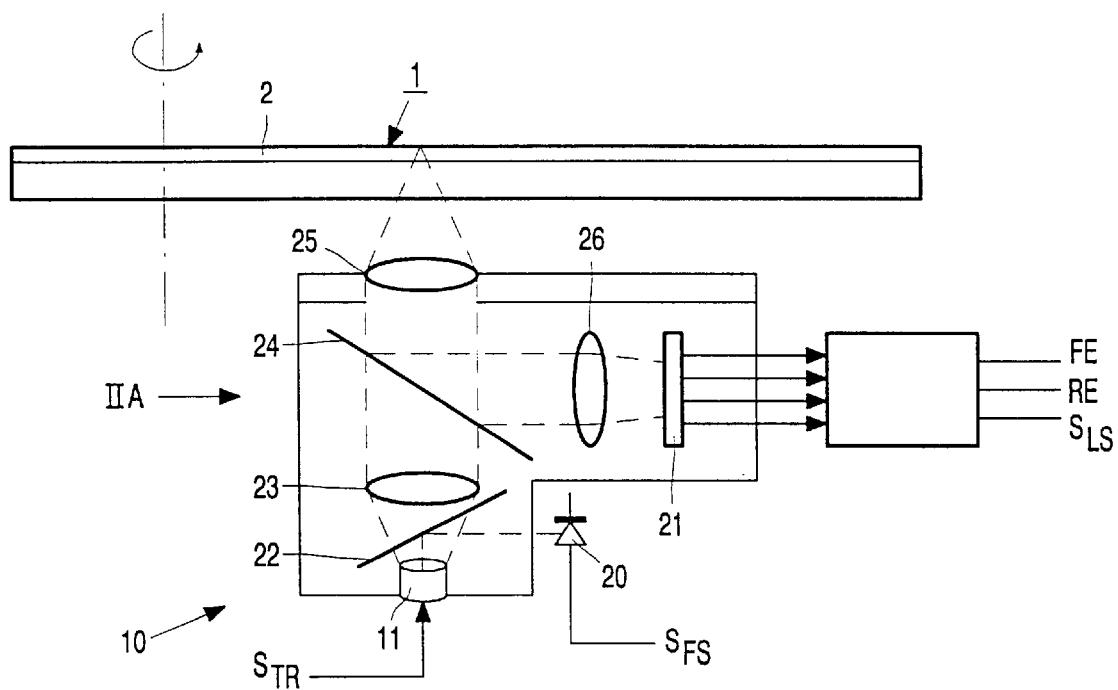
FIG. 2 shows a part of the device in greater detail.
Figure 2A:
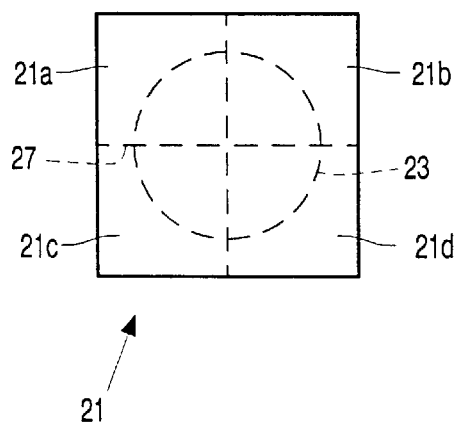
FIG. 2A shows a further detail of this part in a view IIA in FIG. 2.

In the present embodiment the transducer 10 is used both for writing information onto the information carrier and for reading information from the information carrier. Alternatively, different transducers may be used for reading and for writing information. The transducer 10 is shown in greater detail in FIG. 2. In addition to the radiation source 11 the transducer includes an optical system and a first detector 20 as well as a second detector 21. The optical system includes a first beam splitter 22, a lens 23, a second beam splitter 24, a focusing objective 25 and an astigmatic element 26. The second detector 21 has been divided into subdetectors 21a–21d (see FIG. 2A). In the first mode of operation the radiation source 11 generates a radiation beam in response to the control signal $S_{TR}$. The first beam splitter 22 projects a fraction of the radiation in the radiation beam onto the first detector 20. The output signal $S_{FS}$ supplied by the first detector 20 is applied to the regulating means 17 in order to adapt the power supplied to the radiation source 11 to the response of the radiation source 11 to the supplied power. Furthermore, the radiation beam is imaged onto the information layer 2 of the information carrier 1 by the lens 23, via the beam splitter 24 and by means of the focusing objective 25 and produces a physically detectable effect, in the present case an optically detectable effect, in this layer, In the second mode of operation of the device the radiation source 11 also generates a radiation beam. In the same way as in the first mode of operation the radiation beam is imaged onto the information layer 2. The amount of radiation reflected from the information layer 2 differs in dependence on the optically detectable effect.

The reflected radiation is imaged on the detector 21 via the focusing objective 25, the beam splitter 24 and the astigmatic element 26. In response to the incident radiation the detector 21 generates a signal, in the present case a quadruple signal. A preprocessor derives a signal FE, a signal RE and the read signal $S_{LS}$ from the quadruple signal. The servo system 15 uses the signal FE for focus control of the radiation beam on the information carrier 1. The servo system 15 uses the signal RE for the radial positioning of the transducer 10.

Channel decoding means 30 and error correction decoding means 31 derive an output signal $S_{OUT}$ from the read signal $S_{LS}$.

Figure 3:
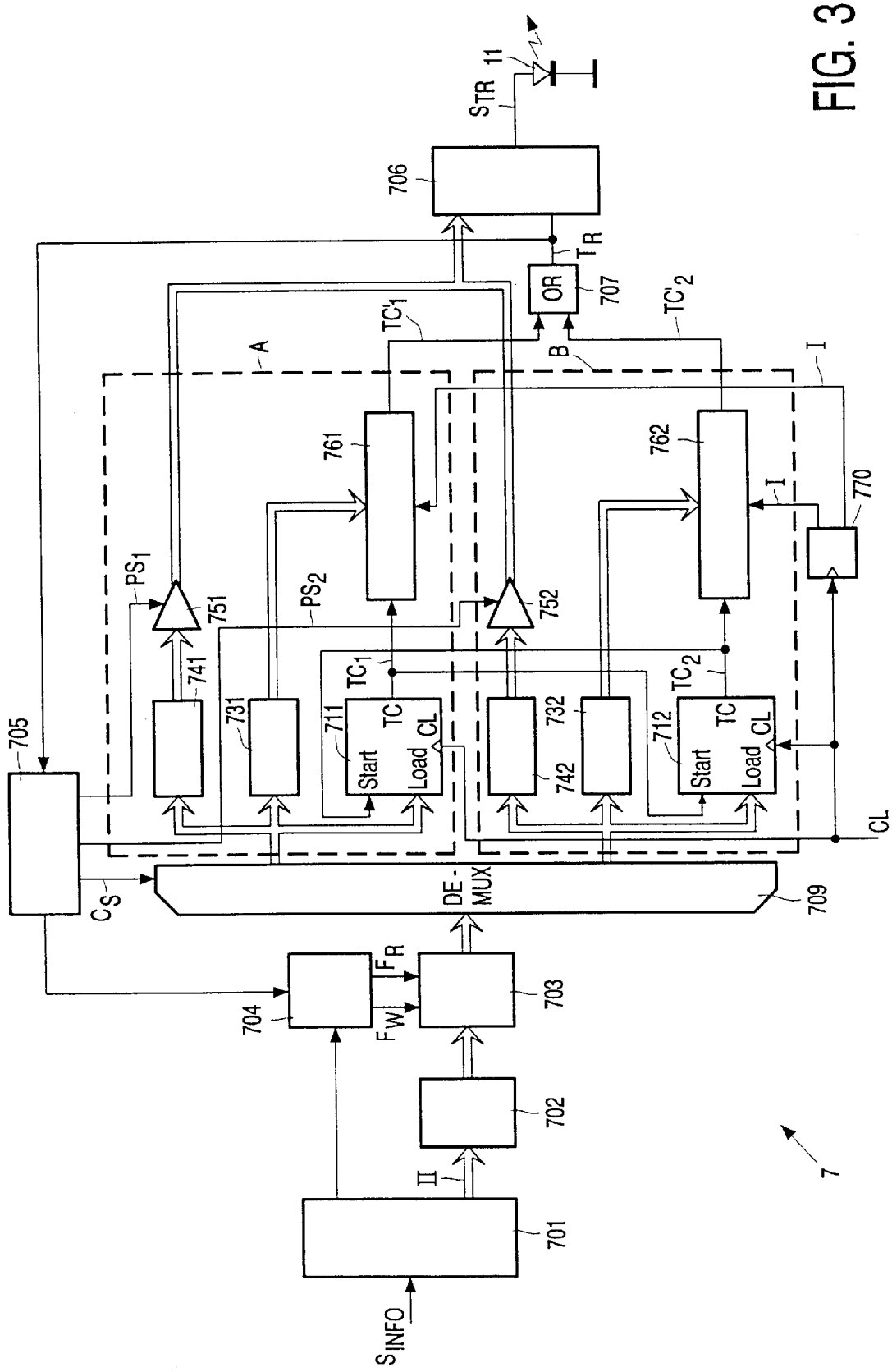
FIG. 3 shows a further part of the device shown in FIG. 1.

The conversion means 7 are shown in greater detail in FIG. 3. The conversion means 7 include means 702 for assigning properties of the pulse sequences to symbols in the information signal $S_{INFO}$. The assignment means may, for example, take the form of a microprocessor which calculates the properties to be assigned by means of an algorithm. In the present embodiment the assignment means are formed by memory means 702 in which for each symbol to be written a series of information units is stored relating to a pulse sequence to be generated. Each information unit includes a first parameter SEL1 which is indicative of a quiescent current setting of the radiation source 11, and a parameter SEL2 which is indicative of a difference current, the total current $S_{TR}$ supplied to the radiation source 11 being equal to the sum of the quiescent current and the difference current. The information unit further includes a first parameter TIM1 and a second parameter TIM2 which determine during which time interval the current $S_{TR}$ set by LVL1 and LVL2 is maintained. When this time interval has elapsed the setting of the current $S_{TR}$ is determined by the next information unit. The information unit further includes a parameter MOD, which determines whether an additional modulation is to be superposed on the current through the radiation source. Such a modulation is favorable when the device is in the second mode of operation. It suppresses the so-called relative intensity noise (RIN). The memory means 702 are coupled to a first-in first-out (FIFO) register 703. The FIFO register is addressed by an address generator 704, which is controlled by a state machine 705. For this purpose, the address generator supplies a write address $F_W$ and a read address $F_R$ to the FIFO register 703. The address generator 704 further receives an output signal from a counter 701, which determines the time of the symbol to be written. The state machine 701 further supplies a selection signal $C_S$ to a demultiplexer 709.

The conversion means 7 each have a first and a second pulse control unit A, B. The pulse control units each include a first and a second counter 711, 712 for supplying a signal $TC_1$, $TC_2$ upon expiry of a time interval defined by the first parameter TIM1. The counters 711, 712 each have a first input "Start", a clock input "CL", an input for loading a start value "Load", which is represented by TIM1, and an output "TC" for supplying a count signal $TC_1$, $TC_2$ which indicates when the end of the counting range is reached. The Load inputs of the counters 711, 712 are coupled to the memory means 702 via a demultiplexer 709 and via the FIFO register 703. As soon as a counter has been activated via its Start input the counter starts to count down from the value loaded via the Load input and supplies a signal $TC_1$, $TC_2$ when counting down is finished. The clock inputs of the counters receive the reference signal CL, which has been derived from the information signal $S_{INFO}$. The outputs TC of the first and the second counter are connected to the Start inputs of the second and the first counter, respectively. Each of the counters 711, 712 is coupled to a controllable delay line 761, 762 for delaying the count signal $TC_1$, $TC_2$. The delay lines 761, 762 are controllable by a signal which represents the parameter TIM2. The delay lines 761, 762 are coupled to the memory means 702 via a respective register 731, 732 for the storage of this parameter and via the demultiplexer 709 and the FIFO register 703. Each of the delay lines 761, 762 has an output coupled to a separate input of an OR gate 707. The OR gate 707 has an output coupled to a trigger input of a DA converter 706. A register 741 for the storage of the parameters LVL1 and LVL2 corresponds to the counter 711. Another register 742 for said parameters corresponds to the counter 712. The registers 741, 742 are coupled to a further input of the DA converter 706 via a tristate buffer 751, 752. When a trigger signal is received from the OR gate 707 the DA converter 706 samples the value at the further input and supplies a corresponding current $S_{TR}$ to the solid-state radiation source 11. The conversion means 7 further include a calibration circuit 770 for supplying a calibration signal 1 to the delay lines 761, 762. This has the advantage that the delay in the delay lines is immune to temperature variations or the effects of aging. Moreover, it is thus achieved that the delay lines 761, 762 delay the count signal $TC_1$, $TC_2$ by substantially the same amount for a given value of the parameter TIM2.

Figure 5:
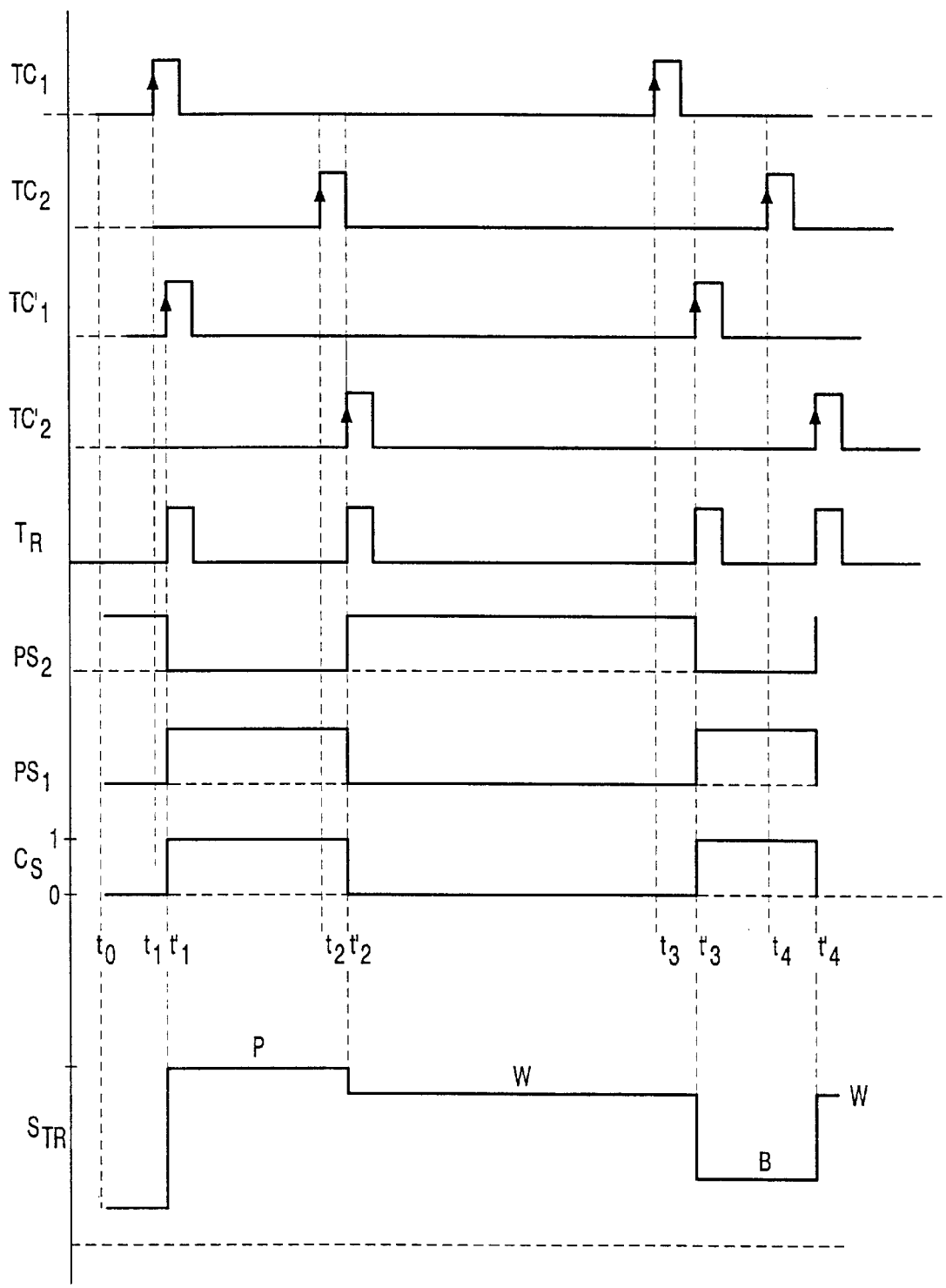
FIG. 5 shows an example of signals appearing in the part shown in FIG. 3.

The operation of the conversion means will be explained with reference to FIGS. 4 and 5. FIG. 4 shows an example of a part of the content of the memory means. FIG. 5 shows some signal waveforms which appear in the conversion means shown in FIG. 3. The decoding means 701 derive from the information signal $S_{INFO}$ a symbol indication II which is indicative of the length of the symbol to be written. The symbol indication II corresponds to a start address 702 where the first information unit for this symbol is located. FIG. 4 shows by way of example the memory content for the symbol referred to as 16 in EFM. This symbol represents an interval in which the information signal has a constant value for 6 clock cycles. The first information unit at the address referenced AI6 is loaded into the FIFO register at an address defined by the signal $F_W$ from the address generator 704. Subsequently, the information unit is loaded from the FIFO register 703 into the counter selected by the signal $C_S$, for example 711, and the associated registers 731, 741 via the demultiplexer 709. At an instant t0 the selected counter 711 starts to count down from the start value TIM1 belonging to the first information unit. During the count-down the selection signal $C_S$ of the state machine 705 assumes the logic value "0", as a result of which the second information unit (address AI6+1) can be loaded into the pulse control unit B. When the countdown of the counter 711 is finished at an instant t1 this counter supplies a signal $TC_1$. This signal starts the counter 712, which in the meantime has been loaded with the start value TIM1 of the second information unit. At an instant t1' the delay line 761 supplies a signal $TC_1'$ which has a delay defined by the value of TIM2 in the register 731 with respect to the signal $TC_1$. In response to the signal $TC_1'$ a trigger pulse $T_R$ appears at the output of the OR gate 707. At said instant t1' the tristate buffer 752 of the second pulse control unit B is in the open state ($PS_2$="1"),as a result of which the value at the output of the register 742 is sampled by the DA converter 706. At the instant t1' the signal $S_{TR}$ assumes the value represented by the value of LVL1 and LVL2 of the second information unit, in the present case a pre-heat pulse P. During the count-down of the counter 712 of the pulse control unit B the third information unit (address AI6+2) is loaded into the pulse control unit A. When the count-down of the counter 712 is finished at an instant t2 this counter supplies a signal $TC_2$ as a result of which the counter 711 of the first pulse control unit A starts. Subsequently, the delay line 762 supplies a signal $TC_2'$ at an instant t2', which signal has a delay defined by the value of TIM2 in the register 732 with respect to the signal $TC_2$. In response to the signal $TC_2'$ the OR gate 707 supplies a trigger pulse $T_R$. Consequently, the value of LVL1 and LVL2 of the third information unit, which in the meantime has been loaded into the register 741, is sampled by the DA converter at said instant t2', as a result of which the preheat pulse P is terminated and a write pulse W (LVL1=2, LVL2=5) begins. The write pulse is followed by a bias pulse B (LVL1=2, LVL2=2). Likewise, a write pulse and a bias pulse are generated alternately four times in succession, after which a cooling pulse (LVL1=2, LVL2=3) and an erase pulse (LVL1=2, LVL2=4) follow.

In the present embodiment the conversion means have two pulse control units A, B, one of the pulse control units being loaded while the other pulse control unit is active. If a very short pulse duration in the control signal is required another embodiment is favorable, in which the conversion means have a larger number of pulse control units, for example eight, and in which a plurality of pulse control means, for example two, are loaded at the same time. Thus, more time is available for loading the pulse control units.

Figure 6:
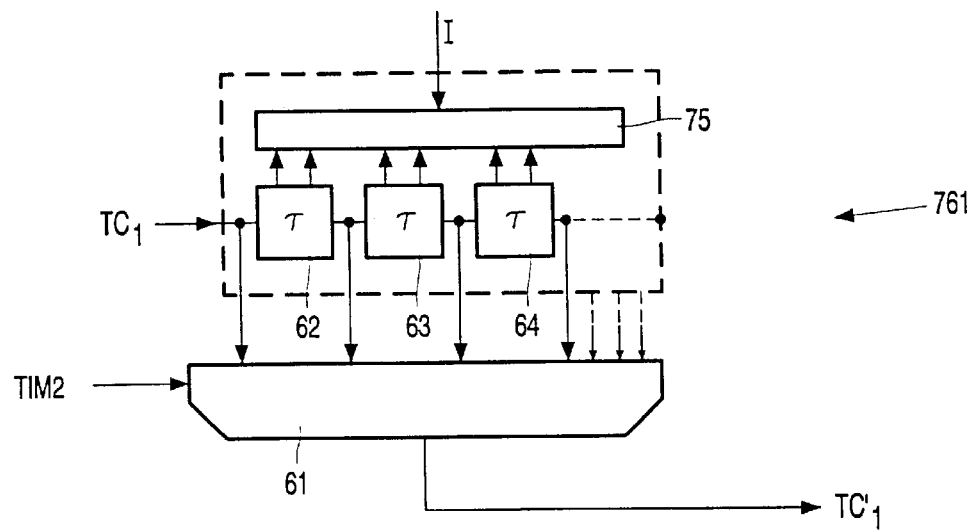
FIG. 6 shows a circuit section of the part shown in FIG. 3.

One of the delay lines 761 is shown in greater detail in FIG. 6. The other delay 762 is identical thereto. The shown delay line 761 comprises a chain of delay elements 62, 63, 64 . . . . The input of the delay line as well as the outputs of the delay elements 62, 63, 64 . . . are coupled to respective inputs of a multiplexer 61. The multiplexer 61 further has a control input coupled to the register 731, which stores the value of the parameter TIM2. By means of the signal TIM2 at the control input the input signal $TC_1$ of the delay line or one of the output signals of the delay elements 62, 63, 64 can be selected, thereby enabling the delay of the signal $TC_1$ to be controlled in steps having a step size equal to a fraction of the duration of a clock cycle of the reference clock CL. The step size is determined by the calibration signal I, which in the present case is a bias current. A current mirror 60 supplies a replica of the bias current I to each of the delay elements 62, . . . The delay elements 62, . . . have a delay which is shorter according as the bias current I is larger. Since the delay elements of both delay lines 761, 762 receive equal bias currents I they produce the same delay for a given value of the parameter TIM2.

Figure 7:
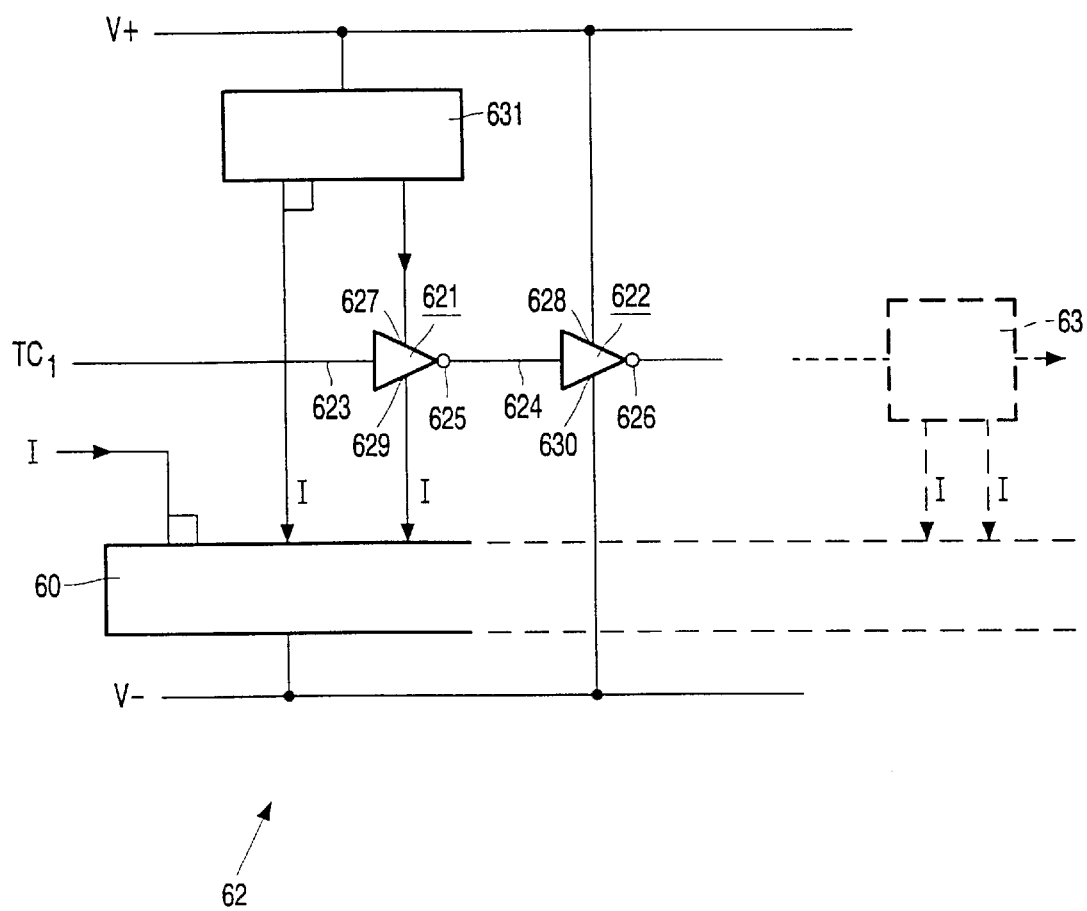
FIG. 7 shows a detail of the circuit section shown in FIG. 6.

One of the delay elements 62 of the delay line 761 is shown in greater detail in FIG. 7. The other delay elements are identical thereto. The delay elements comprise a first and a second inverter 621, 622. Each of the inverters has an input 623, 624, an output 625, 626, a first supply line 627, 628 and a second supply line 629, 630. The input 623 of the first inverter 621 forms the input of the delay element 62. The first inverter 621 has its output 625 coupled to the input 624 of the second inverter 622. The output of the second inverter 622 forms the output of the delay element 62. The first supply line 627 and the second supply line 629 of the first inverter 621 receive a supply current I from a first current-supplying current source 631 and a supply current I of the same magnitude but of opposite polarity from a current-draining current source 60. The supply lines 628, 630 of the second inverter 622 are energized by a voltage source V+, V−. The supply current I is equal to the bias current and serves as a calibration signal. The current mirror 60 also forms a current-draining current source for the following delay elements 63, . . . in the delay line 62.

When the value of the signal $TC_1$ at the input 623 of the delay element changes the value at the output 625 of the first inverter 621 changes also, but with a time constant which is substantially inversely proportional to the bias current I. The second inverter 622 does not produce any appreciable delay in comparison with the first inverter 621 because it can drain a substantially larger current from the voltage source V+, V−. The second inverter 622 compensates for the inversion by the first inverter 621, as a result of which the incoming signal $TC_1$ is merely delayed.

Figure 8:
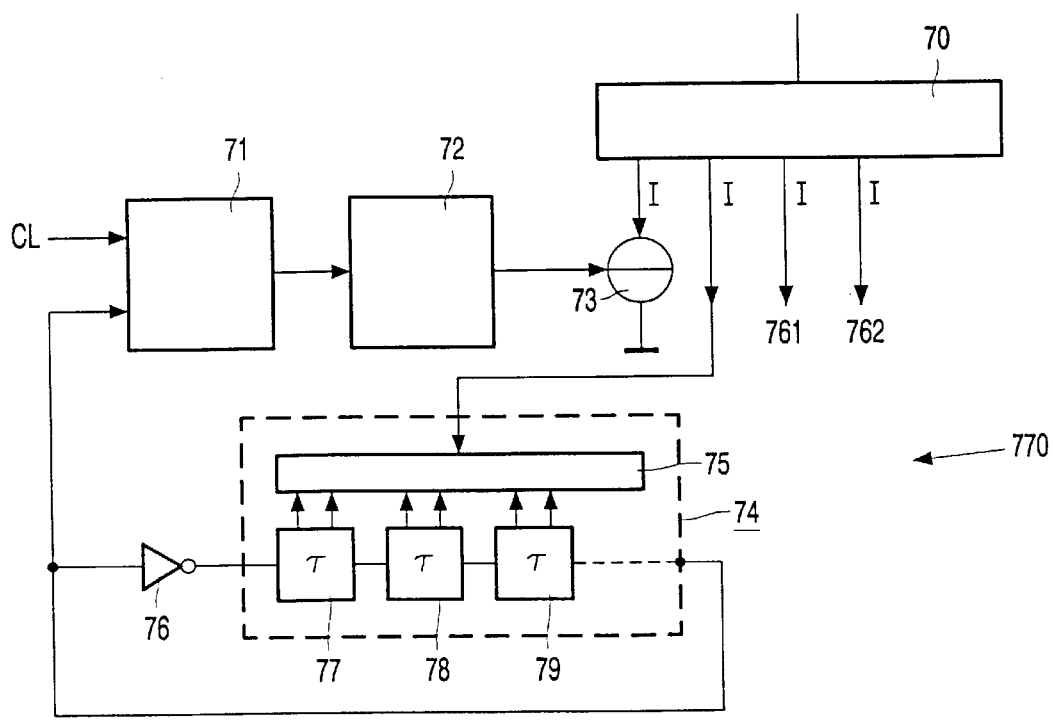
FIG. 8 shows another circuit section of the part shown in FIG. 3.

FIG. 8 shows the calibration circuit 770. The calibration circuit 770 comprises phase-comparison means 71, a loop filter 72 in the form of a low-pass filter, and a delay line 74. The delay line has delay elements 77, 78, 79 which are identical to the delay element 62 described with reference to FIG. 7. The delay line 74 has an input and an output coupled to one another via an inverting element 76. The delay line 74 thus operates as a ring oscillator. The current mirror 75 drains a current I supplied by the current mirror 70. This current mirror 70 is driven by a current-draining current source 73, which is controlled by an output of the loop filter 72. The ring oscillator 74, 76 has an output coupled to an input of the phase comparison means 71. The phase comparison means 71 further have an input coupled to the reference clock CL. The delay in the delay elements 77, . . . and, consequently, the frequency generated by the ring oscillator 74, 76 depends on the bias current I. The loop formed by the phase comparison means 71, the loop filter 72, the controllable current source 73, the current mirror 70, and the ring oscillator 74, 76 operates as a phase-locked loop, as a result of which the ring oscillator oscillates with the same frequency and substantially the same phase as the reference signal CL. This means that for the current I each of the delay elements 77, 78, . . . is biased in such a manner that it produces a delay $\tau$ equal to T/2N, where T is the duration of one cycle of the reference signal and N is the number of delay elements in the delay line 74. In the case that the delay line 74 has five delay elements the delay $\tau$ is 0.1 T. Preferably, the delay lines 761 and 762 have twice as many delay elements as the delay line 74 of the calibration circuit 770. This makes it possible to delay the signals $TC_1$, $TC_2$ in the delay lines 761, 762 by a time interval $n\tau$ at can be varied over the whole range from 0 to T. It is to be noted that instead of phase comparison means 71 frequency comparison means may be used.

Although the invention has been described with reference to preferred embodiments, the invention is not limited thereto. Thus, many variants are conceivable to one skilled in the art without departing from the scope of the invention as defined in the claims. The invention, insofar as it is embodied in the device, can be implemented by hardware as well as software means and different "means" may be materialized by the same hardware item. The use of the verb "to comprise" does not exclude the presence of elements other than those mentioned in a claim. The use of the indefinite article "a" before an element does not exclude the presence of a plurality of such elements. The invention resides in any novel feature or combination of features.

What is claimed is:

1. A device for writing information onto an information carrier, which device comprises:
   conversion means for converting symbols in an information signal into pulse sequences in a control signal; and
   a transducer for generating a physically detectable pattern on the information carrier in response to the control signal,
   and wherein:
      the conversion means include assignment means for assigning properties of the pulse sequences to symbols in the information signal, which properties include the duration and the magnitude of pulses in the pulse sequences,
      the conversion means further include at least one counter for supplying a count signal after expiry of a time interval, which counter is coupled to the assignment means,
      the conversion means further include a controllable delay line coupled: to the at least one counter, for delaying the count signal, and to the assignment means.

2. A device as claimed in claim 1, characterized in that the assignment means are formed by memory means.

3. A device as claimed in claim 1, characterized in that the delay line includes a chain of delay elements and a multiplexer, which multiplexer has signal inputs which are each coupled to a respective one of the outputs of the delay elements.

4. A device as claimed in claim 3, characterized in that the conversion means further include a calibration circuit comprising a ring oscillator including a chain of delay elements, the delay elements of the delay line and of the chain of the ring oscillator having a delay which is controllable by a calibration signal, the calibration circuit further including error-signal generating means, for generating an error signal from an output signal of the ring oscillator and a reference signal, and including means for generating the calibration signal from the error signal.

5. A device as claimed in claim 4, characterized in that the conversion means include one or more further counters and further delay lines coupled thereto, each of the delay lines being controlled by the calibration signal.

6. A device as claimed in claim 4, characterized in that the delay elements include a first and a second inverter, each of the inverters having an input, an output, a first supply line and a second supply line, the input of the first inverter forming the input of the delay element, the first inverter having its output coupled to the input of the second inverter, and the output of the second inverter forming the output of the delay element, the first supply line and the second supply line of the first inverter respectively receiving a supply current from a first current-supplying current source and a supply current of equal magnitude and of opposite polarity from a current-draining current source, the supply lines of the second inverter being energized from a voltage source, the supply current serving as the calibration signal.

7. A device as claimed in claim 1, characterized in that the controllable delay line includes a chain of delay elements and a multiplexer, which multiplexer has signal inputs which are coupled to a respective one of the outputs of the delay elements.

8. A device as claimed in claim 2, characterized in that the delay line includes a chain of delay elements and a multiplexer, which multiplexer has signal inputs which are each coupled to a respective one of the outputs of the delay elements.

9. A device as claimed in claim 8, characterized in that the conversion means further include a calibration circuit comprising a ring oscillator including a chain of delay elements, the delay elements of the delay line and of the chain of the ring oscillator having a delay which is controllable by a calibration signal, the calibration circuit further including error-signal generating means, for generating an error signal from an output signal of the ring oscillator and a reference signal, and including means for generating the calibration signal from the error signal.

10. A device as claimed in claim 9, characterized in that the conversion means include one or more further counters and further delay lines coupled thereto, each of the delay lines being controlled by the calibration signal.

11. A device for writing information onto an information carrier, which device comprises:
    conversion means for converting symbols in an information signal into pulse sequences in a control signal; and
    a transducer for generating a physically detectable pattern on the information carrier in response to the control signal,
    and wherein:
       the conversion means include assignment means for assigning properties of the pulse sequences to symbols in the information signal,
       the properties include the duration and the magnitude of pulses in the pulse sequences, the conversion means further include at least one counter for supplying a count signal after expiry of a time interval, which counter is coupled to the assignment means, the conversion means further include a controllable delay line coupled: to the at least one counter, for delaying the count signal, and to the assignment means, the delay line includes a chain of delay elements and a multiplexer, which multiplexer has signal inputs which are each coupled to a respective one of the outputs of the delay elements, and the comparison means further include a calibration circuit comprising a ring oscillator including a chain of delay elements, the delay elements of the delay line and of the chain of the ring oscillator having a delay which is controllable by a calibration signal, the calibration circuit further including error-signal generating means, for generating an error signal from an output signal of the ring oscillator and a reference signal, and including means for generating the calibration signal from the error signal.

12. device as claimed in claim 11, characterized in that the conversion means include one or more further counters and further delay lines coupled thereto, each of the delay lines being controlled by the calibration signal.

13. A device as claimed in claim 11, characterized in that the delay elements include a first and a second inverter, each of the inverters having an input, an output, a first supply line and a second supply line, the input of the first inverter forming the input of the delay element, the first inverter having its output coupled to the input of the second inverter, and the output of the second inverter forming the output of the delay element, the first supply line and the second supply line of the first inverter respectively receiving a supply current from a first current-supplying current source and a supply current of equal magnitude and of opposite polarity from a current-draining current source, the supply lines of the second inverter being energized from a voltage source, the supply current serving as the calibration signal.

14. A device as claimed in claim 9, characterized in that the delay elements include a first and a second inverter, each of the inverters having an input, an output, a first supply line and a second supply line, the input of the first inverter forming the input of the delay element, the first inverter having its output coupled to the input of the second inverter, and the output of the second inverter forming the output of the delay element, the first supply line and the second supply line of the first inverter respectively receiving a supply current from a first current-supplying current source and a supply current of equal magnitude and of opposite polarity from a current-draining current source, the supply lines of the second inverter being energized.

* * * * *